May 2, 1967    G. H. PORATH ETAL    3,317,008
INDEXING AND POSITIONING SYSTEM
Filed Sept. 15, 1965    3 Sheets-Sheet 1
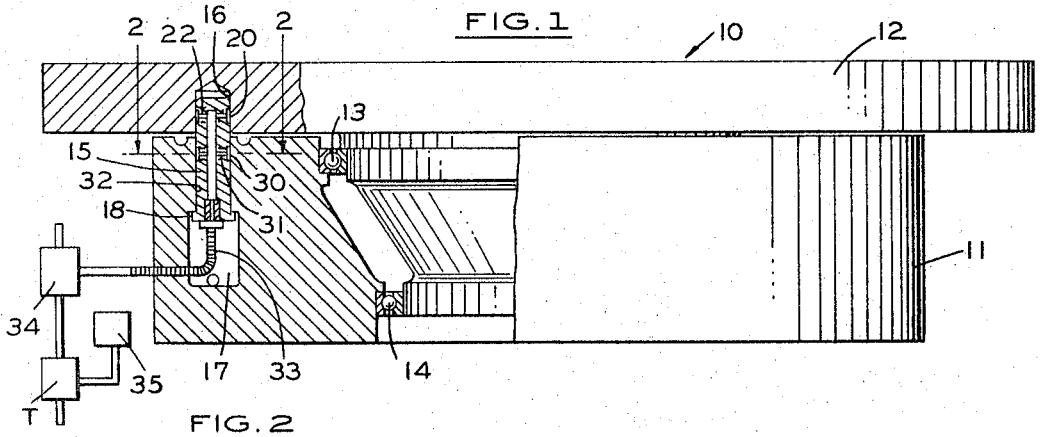
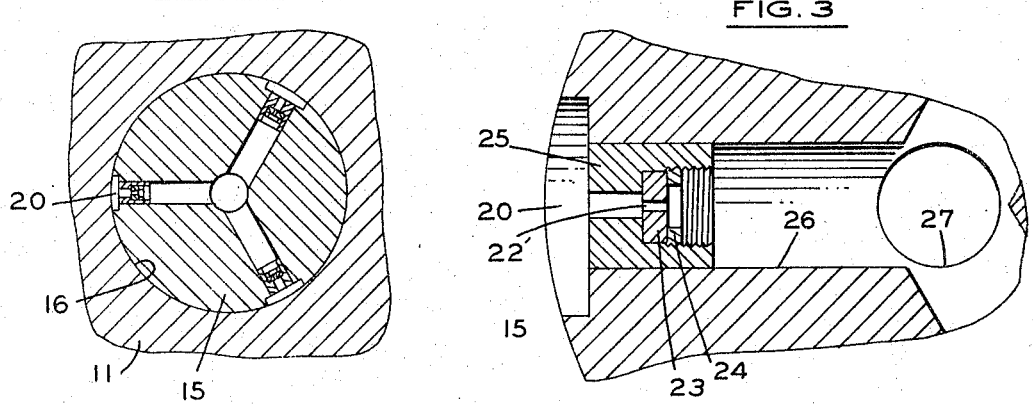
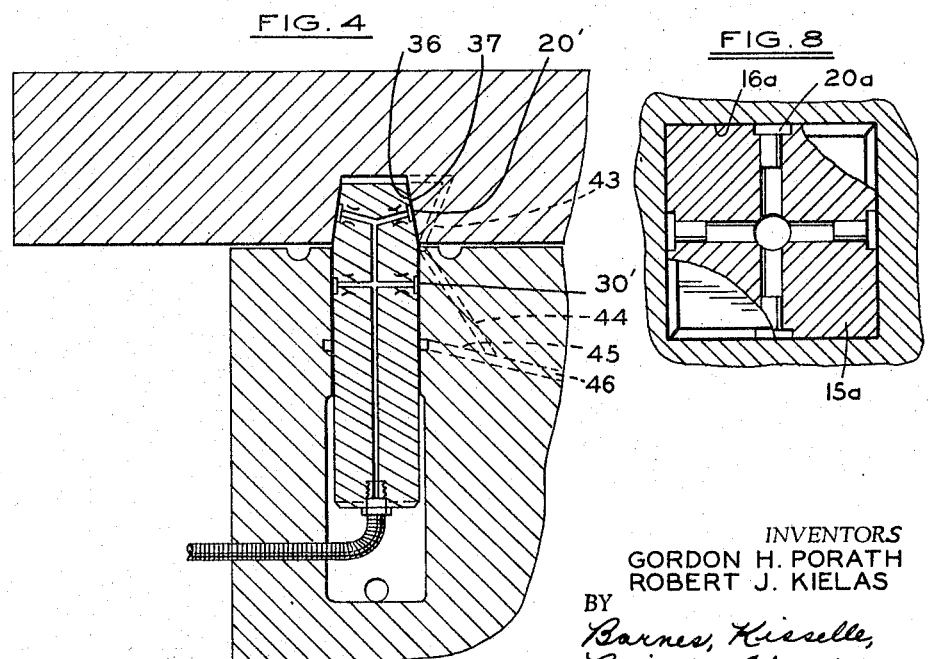
INVENTORS
GORDON H. PORATH
ROBERT J. KIELAS
BY
Barnes, Kisselle,
Raisch & Choate
ATTORNEYS

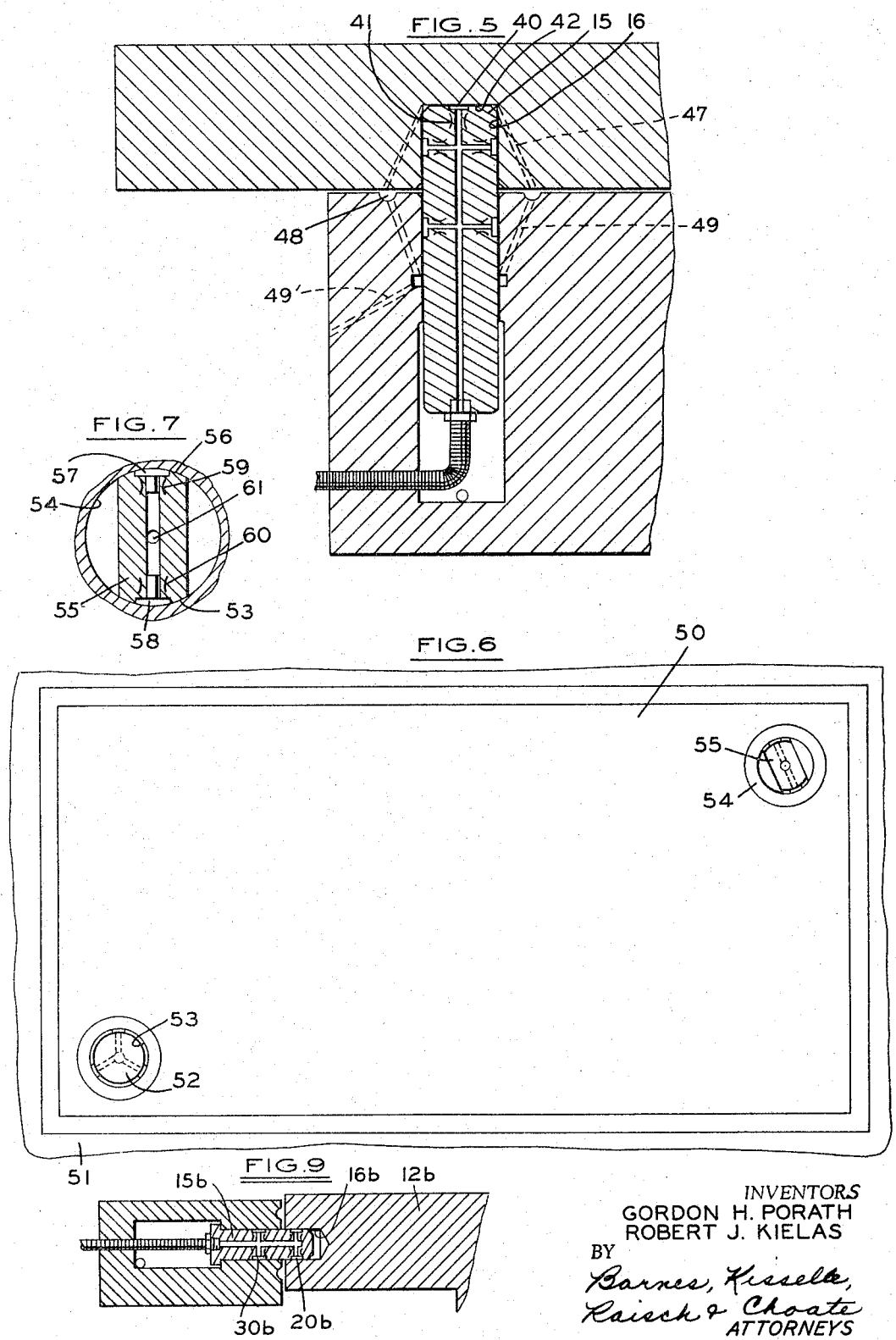

May 2, 1967 G. H. PORATH ETAL 3,317,008
INDEXING AND POSITIONING SYSTEM
Filed Sept. 15, 1965 3 Sheets-Sheet 3
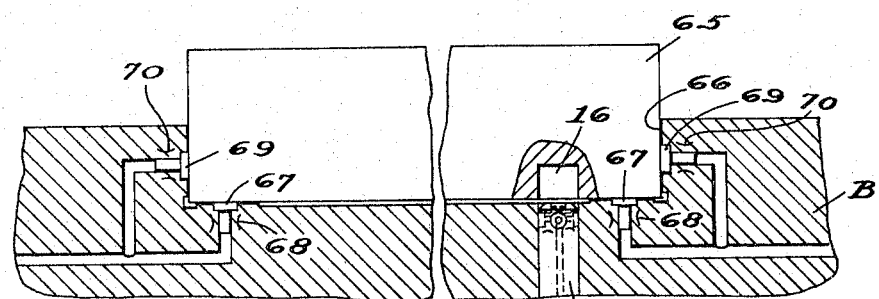
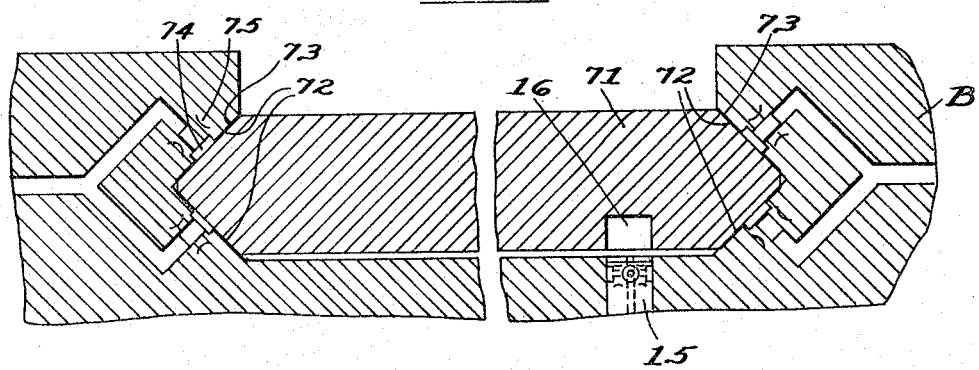
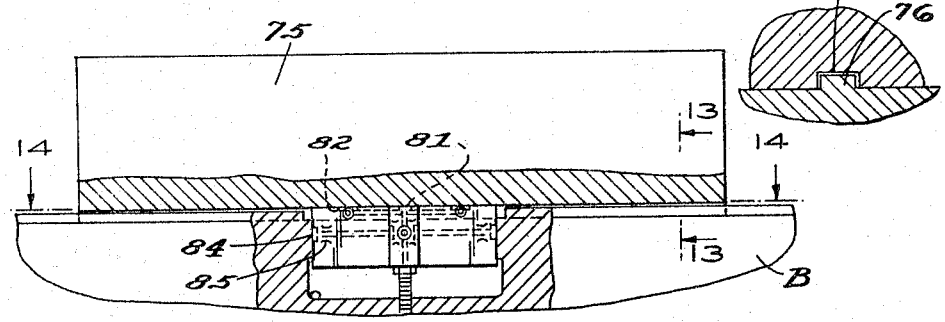
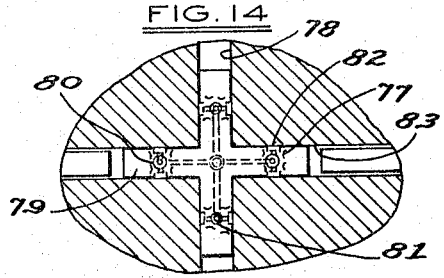
INVENTORS
GORDON H. PORATH
ROBERT J. KIELAS
BY
Barnes, Kisselle,
Raisch & Choate
ATTORNEYS

United States Patent Office 3,317,008
Patented May 2, 1967

3,317,008
INDEXING AND POSITIONING SYSTEM
Gordon H. Porath, Detroit, and Robert J. Kielas, Livonia, Mich., assignors to Century-Detroit Corporation, Detroit, Mich., a corporation of Michigan
Filed Sept. 15, 1965, Ser. No. 487,413
24 Claims. (Cl. 188—69)

This invention relates to indexing and positioning systems for use with dial index machines, shuttle machines, machines with indexing turrets, transfer machines and similar devices when it is desired to locate accurately a rotary table, slide, turret, transfer pallet, part or the like.

In various machining, assembly and scientific applications, it is desirable to operate a dial index machine, shuttle machine, turret-type machine or transfer machine to bring a rotary table, slide, turret, transfer pallet or part into predetermined accurate location. For example, it is conventional in a dial index table, turret-type machine or the like to rotate the table or turret from one position to another by appropriate drives such as a Geneva drive, lead screw, cylinder or the like and thereafter bring one or more pins or bars with a conical, bullet-nosed or trapezoidal wedge configuration into mating slots or openings to lock the table or turret in position. Similarly in shuttle-type machines, a slide is moved from one position to another by means of a cylinder, lead screw or the like and positioned with one or more pins or wedges. Rotary tables, turrets, and slides are sometimes positioned with more than one pin or wedge or a combination of both.

In transfer machines, pallets or holding fixtures are transferred by means of cylinders, chain mechanism or the like from one position or station to another. A similar pin or wedge arrangement is used to locate each pallet or holding fixture in each position or station. Normally, two or more pins or wedges are used to locate each pallet or fixture in each position. In certain type transfer machines, such as the walking-beam type or the like, the actual part to be machined or assembled, instead of a pallet or holding fixture, is transferred from one position or station to another. In these cases, the part is located at each station by entering a pin or pins into registry holes in the part or entering a key or keys into keyways in the part or locating against an edge or edges or a contour on the part or any combination of the above.

A major problem with respect to such indexing and positioning devices is that as each locating pin is made more accurate, by reducing tolerances, increasing preloading and the like, there is a tendency for greater wear during usage resulting in loss of accuracy. Further, dirt, chips or foreign material become embedded between the surfaces of the locating devices causing misalignment. Where multiple positioning devices are used as in the case of transfer pallets, transfer holding fixtures or transferred parts or the like, the tolerances between the mating surfaces of the locating devices necessarily have to be loose in order that a number of pallets, fixtures or parts can be located in a number of positions or stations. For example, on a pallet-type transfer machine using two pins at each station to locate each pallet, in order for each set of pins at each station to enter a set of holes in each pallet the size of the pins have to be considerably smaller than the holes entered. This condition results in the pallets being mislocated at various positions in accordance with the "play" or gap between the pins and the holes. The reason for this is that in actual practice it is impossible to get exactly the same center distance between each set of two pins at every station and exactly the same center distance between each set of two holes in every pallet.

It is an object of this invention to provide an indexing and positioning system wherein extreme accuracy in positioning is achieved.

It is a further object of the invention to provide such a system wherein wear is substantially entirely eliminated so that the accuracy is retained for the life of the device.

It is a further object of the invention to provide such a system which permits cleaning of foreign material from the accurate locating surfaces of the positioning or indexing system.

It is a further object of the invention to provide such a system that will compensate and accurately position a rotary table, slide, turret, transfer pallet, part or the like which uses more than one indexing and positioning device, such as two or more pins, wedges, keys, edges or any combination of these or the like, at the mean position of the varying "gap" between the surfaces of the positioning or locating devices.

It is a further object of the invention to provide such a system which permits positioning a rotary table, slide, turret, transfer pallet, part or the like with an accuracy not heretofore achieved.

Basically, the invention comprises providing circumferentially spaced pressure pockets or pads at the complementary surfaces of the opening or openings and pin or pins and supplying fluid under pressure to the pads so that a film of fluid flows continuously between the surfaces of the pin and the opening holding the movable table or transfer plate in positive accurate lock relation with respect to the base. Further in accordance with the invention, an orifice or other fluid restrictor is associated with each pressure pad so that the fluid flows under predetermined pressure to each pressure pad. If there is a tendency to move the table or plate member, the pressure in one or more of the pads will increase and the pressure in one or more of the diametrically opposite pads will decrease tending to produce a force which returns the movable table or plate to its original position. By this arrangement, the metal-to-metal contact is entirely eliminated so that there is substantially no wear and the accuracy of the locating system is maintained.

In the drawings:

FIG. 1 is a part sectional partly diagrammatic view of a rotary table embodying the invention.

FIG. 2 is a fragmentary sectional view on an enlarged scale taken along the line 2—2 in FIG. 1.

FIG. 3 is a fragmentary sectional view on an enlarged scale of a portion of the apparatus shown in FIG. 2.

FIG. 4 is a fragmentary sectional view on an enlarged scale similar to FIG. 1 showing a modified form of the invention.

FIG. 5 is a view similar to FIG. 4 showing a further modified form of the invention.

FIG. 6 is a fragmentary plan view of a further modified form of the invention.

FIG. 7 is a horizontal sectional view through a portion of the apparatus shown in FIG. 6.

FIG. 8 is a sectional view through a modified form of the apparatus.

FIG. 9 is a sectional view through a further modified form of the apparatus.

FIG. 10 is a transverse sectional view through a further modified form of the apparatus.

FIG. 11 is a transverse sectional view through a still further modified form of the apparatus.

FIG. 12 is a longitudinal sectional view through a still further modified form of the apparatus.

FIG. 13 is a fragmentary sectional view taken along the line 13—13 in FIG. 12.

FIG. 14 is a fragmentary sectional view taken along the line 14—14 in FIG. 12.

Referring to FIG. 1, a conventional rotary table 10 comprises a base 11 and a table 12 that is mounted for rotation by bearings 13, 14. Any bearing arrangement may be used such as is well known in the art. The table 12 is adapted to be indexed successively by appropriate apparatus, not shown, such as a Geneva drive, lead screw or cylinder. It is desirable to lock the table 12 relative to the base 11 in each of the index positions.

In accordance with the invention, one or more locating pins 15 are provided in the base 11 and are adapted to be projected upwardly into one of a plurality of openings 16 located accurately in the table 12 at the index positions. As shown in FIG. 1, each pin 15 is adapted to be projected upwardly by hydraulic fluid supplied under pressure to a chamber 17 which acts upon the lower end of the pin 15 to push it upwardly into the opening 16 or else by a separate actuating device, not shown, such as a hydraulic cylinder. A flange 18 on the lower end of the pin 15 limits the upward movement of the pin and prevents the pin from contacting the base of the opening 16.

As shown in FIG. 2, the opening 16 is accurately formed and complementary to the outer surface of the upper end of the pin 15. A first row of circumferentially spaced pressure recesses or pads 20 is provided on the upper end of the pin 15 and is adapted to supply fluid under pressure, as presently described, between the surface of the openings 16 and the surface of the upper end of the pin 15. Each of the pressure pads 20 is provided with a fluid restrictor shown diagrammatically and designated as 22 in FIG. 1. The fluid restrictor may comprise a capillary or an orifice plate. Thus, as shown in FIG. 3, the restrictor 22' comprises an opening in an orifice plate 23 that is retained in position by lock ring 24 in an insert 25 in passage 26 that extends from an axial opening 27 to the pressure pad 20. In each of the pressure pads 20, the size of the orifice plate 23 is adjusted so that the pressures in the pads 20 circumferentially of the pin are equal.

The relative dimensions are such that a continuous film of fluid flows from the pressure pads 20 between the outer surface of the pin 15 and the surface 16 of the opening. This tends to maintain the rotary table 12 locked in predetermined angular relation to the base 11. In the event that there is any force on the table 12, for example, due to machining or the like being applied to the workpiece on the table 12, the force tending to move the table to restrict flow from one of the pressure pads 20 will tend to move the table away from the one or more of the opposite pressure pads 20 producing a resultant increase in pressure that tends to return the table 12 to its original position.

As further shown in FIG. 1, preferably a second series of pressure pads 30 and associated orifices 31 is provided on an intermediate portion of the pins 15 and cooperates with the surface 32 of the opening in the base 11 in which the pin 15 is provided to maintain the pin 15 similarly in predetermined circumferential relation to the base 11. Each of the pads 30 is provided with an orifice 31 and supplied with fluid from the central openings 27. As shown diagrammatically in FIG. 1, the fluid is supplied to the opening 27 through a flexible conduit 33.

In practice, a solenoid valve 34 controls the flow of fluid to the pressure pads 20, 30 and a solenoid valve 35 controls the flow of pressure to the lower end of the pin 15. A timer T is preferably provided so that the pin 15 is projected upwardly by operation of the valve 35 before the valve 34 is operated to supply the fluid to the pads 20, 30 by actuation of the valve 34.

It can thus be seen that the pin 15 is not only held in stable accurate relation to the base 11, but also functions and cooperates with the opening 16 in the rotary member 12 to hold the rotary member 12 in stable accurate relation to the base 11.

The upper end of the pin need not be cylindrical in configuration but may have various configurations. Thus, it can be frusto-conical as shown in FIG. 4 wherein the upper end of the pin is tapered as at 36 and the sides of the opening 37 have a complementary configuration. The pads 20' and associated orifices are arranged in the same manner as in FIGS. 1–3. Similarly, the pressure pads 30' are provided on an intermediate portion of the pin as shown in FIG. 4.

In the form of the invention shown in FIG. 5, instead of having a flange 18 to limit the upper movement of a pin, another pressure pad 40 is provided on the end of the pin 15 and has an associated orifice 41 which cooperates with the flat base 42 of the opening 16 to cause a thin film of fluid to flow between the end of the pin 15 and the base of the opening 42 and thereby hold the pin in predetermined relation to the base of the opening.

The pin 15 can be of different cross sections. For example, as shown in FIG. 8, the pin 15a is square and is projected into a complementary square opening 16a. Pressure pads 20a are provided in the manner of the previously described form of the invention.

Instead of having the pin 15 project axially into the table 12, one or more pins may be provided which are projected radially into complementary openings in the table. Thus, as shown in FIG. 9, a pin 15b is projected radially into a complementary opening 16b in table 12b. The pin is provided with pressure pads 20b, 30b as in the forms of the invention shown in FIGS. 1–5. In each of the forms of the invention shown in FIGS. 1–5, 8 and 9, if liquid is used as the fluid, drain passages are provided to which the fluid from the pressure pad flows. Thus, as shown in FIG. 4, drain passages 43, 44, 45 extend to a common drain 46 from the peripheries of the surfaces to which the pads supply fluid. As shown in FIG. 5, drain passages 47 extend to a collecting ring 48. In turn, a drain passage 49 extends to a common drain 49'. Where liquid under pressure is utilized to project the pin, the liquid supplied to the pressure pads can be of the same type so that some of the liquids from the pressure pads flows downwardly into the chamber 17 and need not be segregated therefrom.

Referring to FIGS. 6 and 7, the invention is shown as applied to a platen transfer plate or table 50 which is moved along from one working station to another. As shown in FIG. 6, at each station at which a base 51 is positioned, a pin 52 is adapted to be projected upwardly into a complementary opening 53 in the transfer plate 50. Pin 52 has preferably two sets of circumferentially spaced pressure pads in the manner of the invention shown in FIGS. 1–3, 4 and 5 and thereby tends to locate one point of the transfer plate 50. The transfer plate 50 is provided with a second cylindrical opening 54 which is adapted to be positioned at a working station above a pin 55 that is not cylindrical but has opposed surfaces 56, 56' (FIG. 7) which lie in a common circumscribing cylinder and which are oriented tangent to an arc whose center is pin 52. Each of the surfaces is provided with pressure pads 57, 58 to which fluid under pressure is supplied to orifices 59, 60 from a central passage 61.

The pin 52 is first projected into its respective opening 53 and the pin 55 is then projected upwardly into the opening 54. Fluid is supplied to the pressure pads of pin 52 and the pressure pads 57, 58 of pin 55 so that a film of fluid tends to flow between the surfaces to locate the transfer plate relative to the pins 52, 55. The pins 52, 55 thus accurately locate the platen or transfer plate relative to the base 51 for performance of a machining operation on a workpiece thereon or for locating a workpiece on the transfer plate accurately for performance of other functions, tests or operations.

In the form of the invention shown in FIG. 10, the platen or workpiece 65 is movable longitudinally along a rectangular channel 66 in the upper surface of a base B. Pressure pads 67 and associated fluid restrictors 68 are provided in the base of the channel at the work stations.

In addition, pressure pads 69 and associated restrictors 70 are provided in the sides of the channel 66 and serve to hold the platen or workpiece 65 in predetermined relation to the base at the work station. One or more pins 15, similar to the pins shown in FIG. 5, are provided in the base surface and project upwardly into openings 16 in the platen or workpiece 65 to accurately locate the platen or workpiece 65 longitudinally of the channel 66. The pins 15 cooperate with the opening 16 in the manner described in connection with FIG. 5.

In the form of the invention as shown in FIG. 12, the workpiece or platen 71 is provided with tapered side surfaces 72, which engage comlementary surfaces 73, in a base B'. The surfaces 73 are formed with pressure pads 74 and associated fluid restrictors 75' to center the workpiece 71 at the work station. One or more pins 15 and associated pressure pads and fluid restrictors are projectable upwardly into opening 16 in the platen or workpiece 71 to accurately locate the platen or workpiece 71 longitudinally of the base B' in a manner similar to FIGS. 5 and 10.

In the form of the invention shown in FIGS. 12–14, the workpiece or platen 75 is movable longitudinally along a base B'' that has a longitudinally extending key 76 on the upper surface thereof which engages a complementary groove 77 in the undersurface of the platen or workpiece 75. The platen or workpiece 75 includes a transverse groove 78 in the undersurface thereof that intersects the groove 77. At the work station, a cross-shaped member 79 is projected upwardly into the grooves 77, 78 to locate the platen or workpiece 75. The cross-shaped member 79 is formed with pressure pads 80 and associated fluid restrictors 81 in the upper surface thereof and pressure pads 82 and associated fluid restrictors 83 in the sides thereof cooperate with and engage the base and sides of the grooves 77, 78 to accurately locate the platen or workpiece 75. In addition, pressure pads 84 and associated fluid restrictors 85 are provided on the sides of the member 79 and cooperate with the opening in the base B to locate the member 79 relative to the opening in the base B''. The member 79 is projected upwardly in the manner of the previously described forms of the invention.

It can thus be seen that there has been provided a novel indexing and positioning system which accurately locates a table or transfer plate and is not subject to the problems of wear or loss of accuracy in use.

The terms work support member, rotary table, and transfer plate as used herein are understood to include arrangements wherein the workpiece itself forms the support, rotary table or transfer plate, as will be readily understood by persons skilled in the art.

I claim:

1. In an indexing and positioning system, the combination comprising
    a base member,
    a work support member mounted for movement relative to said base member,
    at least one opening in one of said members,
    a locating pin movably mounted on the other of said members,
    means for projecting said locating pin into the opening, one of said pin and said opening having a series of circumferentially spaced pressure recesses therein engaging the surface of the other of said pin and said opening in an operative position,
    and a fluid restrictor associated with each said pressure recess,
    means for directing fluid under pressure through each said restrictor to the respective pressure recess,
    whereby when said pin is moved into said opening and fluid is applied to each said pressure recess, said members are held in predetermined spaced relation to one another by flow of a continuous film of fluid from each said pressure recess between the surfaces of said pin and said opening.

2. The combination set forth in claim 1 wherein said means for moving said pin into and out of said opening comprises hydraulic pressure means.

3. The combination set forth in claim 1 wherein each said restrictor is mounted adjacent its respective recess.

4. The combination set forth in claim 1 wherein the end of said pin is cylindrical and said opening has a complementary cylindrical configuration.

5. The combination set forth in claim 1 including the end of one of said pin and said opening having a pressure recess therein.

6. The combination set forth in claim 1 wherein the end of said pin is frusto-conical in configuration, said opening having a complementary configuration.

7. The combination set forth in claim 1 including another series of pressure recesses on one of said pin and said base member, and a fluid restrictor associated with each said pressure recess of said last mentioned series.

8. In an indexing and positioning system, the combination comprising
    a base member,
    a work support member mounted for movement relative to said base member,
    at least one opening in said support member,
    a locating pin movably mounted on said base member,
    means for projecting said locating pin into the opening in said support member,
    said pin having a series of circumferentially spaced pressure recesses therein engaging the surface of said opening in an operative position,
    and a fluid restrictor associated with each said pressure recess,
    means for directing fluid under pressure through each said restrictor to the respective pressure recess,
    whereby when said pin is moved into said opening and fluid is applied to each said pressure recess, said members are held in predetermined spaced relation to one another by flow of a continuous film of fluid from each said pressure recess between the surfaces of said pin and said opening.

9. The combination set forth in claim 8 wherein said means for moving said pin into and out of said opening comprises hydraulic pressure means.

10. The combination set forth in claim 8 including a pressure recess on the end of said pin cooperating with a complementary surface in the base of said opening.

11. The combination set forth in claim 8 including an opening in said base member into which said pin extends, another series of pressure recesses and associated fluid restrictors on said pin cooperating with the surface of said last mentioned opening to maintain said pin in stable relation to said base member.

12. In an indexing and positioning system, the combination comprising
    a base member,
    a rotary table mounted for rotation relative to said base member,
    at least one opening in said table,
    a locating pin movably mounted on said base member,
    means for projecting said locating pin into the opening,
    said pin having a series of circumferentially spaced pressure recesses therein engaging the surface of the other of said opening in an operative position,
    and a fluid restrictor associated with each said pressure recess,
    means for directing fluid under pressure through each said restrictor to the respective pressure recess,
    whereby when said pin is moved into said opening and fluid is applied to each said pressure recess, said members are held in predetermined spaced relation to one another by flow of a continuous film of fluid from each said pressure recess between the surfaces of said pin and said opening.

13. The combination set forth in claim 11 including an opening in said base member into which said pin extends, another series of pressure recesses and associated fluid restrictors on said pin cooperating with the surface of said last mentioned opening to maintain said pin in stable relation to said base member.

14. In an indexing and positioning system, the combination comprising
 a base member,
 a transfer plate mounted for movement relative to said base member,
 a pair of spaced openings in said transfer plate,
 a locating pin associated and adapted to extend respectively into one of said openings movably mounted on said base member,
 means for projecting said locating pins into said respective openings,
 said pins having a series of circumferentially spaced pressure recesses therein engaging the surface of said openings in an operative position,
 and a fluid restrictor associated with each said pressure recess,
 means for directing fluid under pressure through each said fluid restrictor to the respective pressure recess,
 whereby when said pin is moved into said opening and fluid is applied to each said pressure recess, said members are held in predetermined spaced relation to one another by flow of a continuous film of fluid from each said pressure recess between the surfaces of said pin and said opening.

15. The combination set forth in claim 14 wherein said means for moving said pin into and out of said opening comprises hydraulic pressure means.

16. The combination set forth in claim 14 wherein each said recess is mounted in its pin adjacent its respective recesses.

17. The combination set forth in claim 14 wherein the end of one said pin is cylindrical and its respective opening has a complementary cylindrical configuration, the end of the other said pin being non-circular and having portions circumscribed by a cylinder, the respective opening of said other pin being cylindrical.

18. In an indexing and positioning system, the combination comprising
 a base member,
 a work support member mounted for movement relative to said base member,
 at least one opening in said support member,
 a locating pin movably mounted on said base member,
 means for projecting said locating pin into the opening in said support member,
 means for limiting the extent of movement of said rotating pin into said opening,
 said pin having a series of circumferentially spaced pressure recesses therein engaging the surface of said opening in an operative position,
 and a fluid restrictor associated with each said pressure recess,
 means for directing fluid under pressure through each said restrictor to the respective pressure recess,
 whereby when said pin is moved into said opening and fluid is applied to each said pressure recess, said members are held in predetermined spaced relation to one another by flow of a continuous film of fluid from each said pressure recess between the surfaces of said pin and said opening.

19. In an indexing and positioning system, the combination comprising
 a base member,
 a work support member mounted for movement relative to said base member,
 said base member and said work support member having complementary surfaces,
 one of said base member and said work support member having a plurality of pressure recesses on the complementary surface thereof,
 a fluid restrictor associated with each said pressure recess,
 and means for directing fluid under pressure to each said restrictor to the respective pressure recess to laterally locate said base member relative to said work support member,
 at least one opening in one of said members,
 a locating pin movably mounted on the other of said members,
 means for projecting said locating pin into the opening,
 one of said pin and said opening having a series of circumferentially spaced pressure recesses therein engaging the surface of the other of said pin and said opening in an operative position,
 and a fluid restrictor associated with each said pressure recess,
 means for directing fluid under pressure through each said restrictor to the respective pressure recess,
 whereby when said pin is moved into said opening and fluid is applied to each said pressure recess, said members are held in predetermined spaced relation to one another by flow of a continuous film of fluid from each said pressure recess between the surfaces of said pin and said opening.

20. The combination set forth in claim 19 wherein said complementary surfaces comprise the sides of a retangular channel.

21. The combination set forth in claim 19 wherein said complementary surfaces comprise V-shaped interengaging surfaces.

22. The combination set forth in claim 19 wherein said complementary surfaces include a key and keyway extending longitudinally of said base member.

23. The combination set forth in claim 22 wherein said locating pin extends into said keyway.

24. The combination set forth in claim 23 wherein said work support member includes a transverse keyway,
 said pin including a transverse portion extending into said transverse keyway.

References Cited by the Examiner

UNITED STATES PATENTS 3,153,952   10/1964   Thomas _____ 74—822

FOREIGN PATENTS 333,276   11/1958   Switzerland.

MILTON BUCHLER, *Primary Examiner.*

G. E. A. HALVOSA, *Assistant Examiner.*